United States Patent [19]

Yamada

[11] 4,244,550

[45] Jan. 13, 1981

[54] UMBRELLA SUPPORTING DEVICE FOR BICYCLE

[75] Inventor: Eisuke Yamada, Nogoya, Japan

[73] Assignee: Arakawa Industry Company Limited, Aichi, Japan

[21] Appl. No.: 957,837

[22] Filed: Nov. 6, 1978

[30] Foreign Application Priority Data

Nov. 7, 1977 [JP] Japan ................ 52-149842

[51] Int. Cl.³ .......................... A01K 97/10
[52] U.S. Cl. .................... 248/534; 135/16; 248/316 B; 296/78.1
[58] Field of Search ........... 248/534, 539, 316 B, 248/316 E, 225.4, 226.2, 540; 280/289 H, 289 A; 296/78.1; 297/184; 135/16, DIG. 9

[56] References Cited

U.S. PATENT DOCUMENTS

| 326,214 | 9/1885 | Haitz | 248/534 X |
| 365,282 | 6/1887 | Tillman | 248/316 B |
| 593,360 | 11/1897 | Lottermoser | 248/360 X |
| 1,569,327 | 1/1926 | Linthwaite | 248/316 B |
| 2,667,720 | 2/1954 | Connel, Jr. | 280/289 H |
| 2,917,104 | 12/1959 | Cottle | 248/188.5 X |

FOREIGN PATENT DOCUMENTS

| 15009 | 9/1903 | Austria | 296/78.1 |
| 516181 | 2/1955 | Italy | 296/78.1 |
| 208276 | 4/1940 | Switzerland | 296/78.1 |

Primary Examiner—James T. McCall
Attorney, Agent, or Firm—Mawhinney & Mawhinney & Connors

[57] ABSTRACT

An umbrella supporting device for detachably supporting an umbrella substantially in an upright position at the center of the handlebar of a bicycle. A supporting post is removably attached substantially in an upright position to the stem of the handlebar of the bicycle. The supporting post is divided into upper and lower post members, the former of which is telescopically received and locked in position in the latter. A clamping mechanism is attached to the upper end of the upper post member so as to detachably clamp the handle of the umbrella. The clamping mechanism has a pair of clamping members, the inner sides of which face each other so as to hold inbetween the umbrella handle. An operating lever or bar is used to bring, when manually operated, one of the clamping members toward the other for the clamping purpose. A bracket is fixed to the lower end of the lower post member and is formed with a lock hole, which is sized and positioned to admit the head lock nut of the bicycle so that the umbrella supporting device as a whole can be locked at the handlebar stem of the bicycle.

7 Claims, 9 Drawing Figures

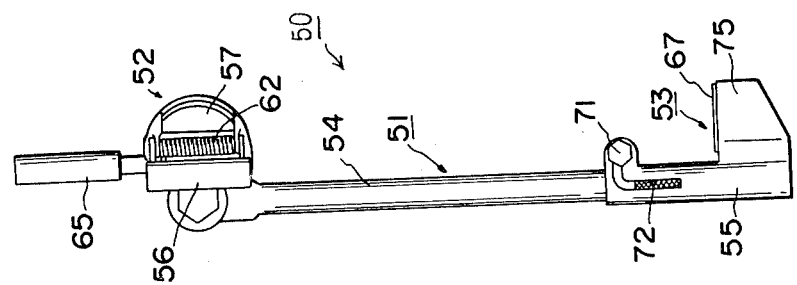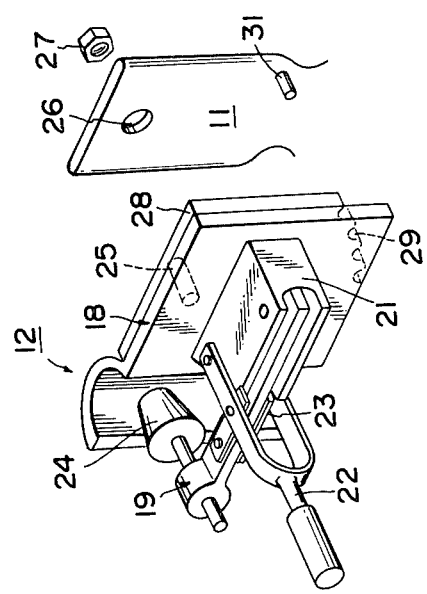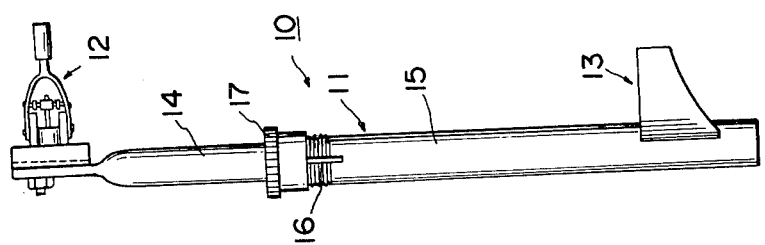

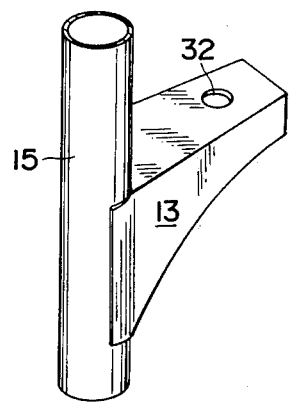
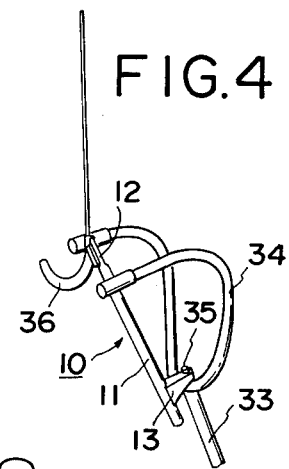
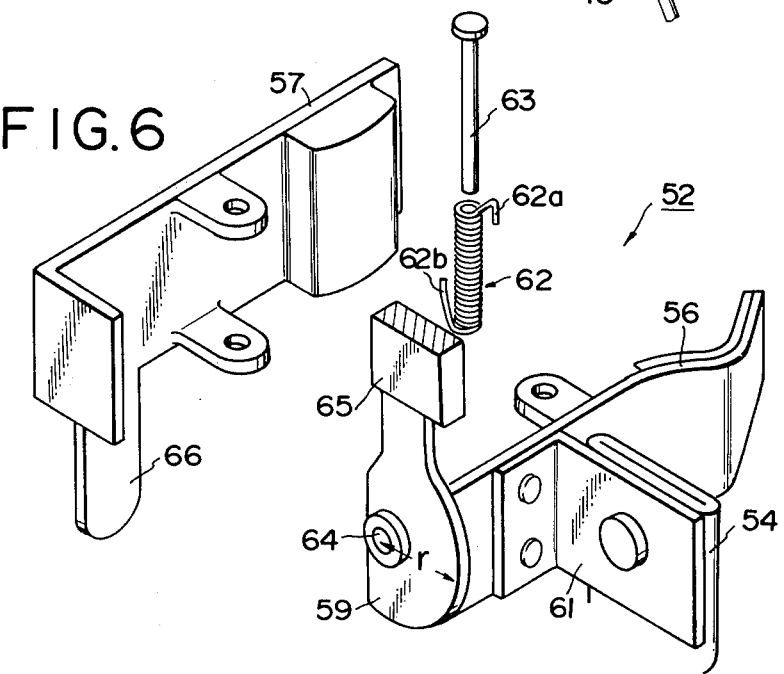

4,244,550

UMBRELLA SUPPORTING DEVICE FOR BICYCLE

BACKGROUND OF THE INVENTION

1. Field of the Invention

The present invention relates to a bicycle, and more particularly to an umbrella supporting device for supporting an umbrella in position on a bicycle so as to obviate a danger which might otherwise take place if a person rides a bicycle with the umbrella in his one hand.

2. Description of the Prior Art

In case a person rides a bicycle under rainy or hot weather, he has to handle the bicycle with his one hand because he carries an umbrella with his other hand. This one-hand ride will often cause a dangerous fall accident as a result the rider loses balance of his body while he is riding up and down on a hill or in rainy weather.

SUMMARY OF THE INVENTION

It is therefore a major object of the present invention to provide an umbrella supporting device for supporting an umbrella in position on a bicycle so that a rider of the bicycle can grip the handlebar with both of his hands without any difficulty, even when an umbrella is in use on wet or hot days.

According to a major feature of the present invention, there is provided an umbrella supporting device for detachably supporting an umbrella substantially in an upright position at the center of the handlebar of a bicycle, comprising: a supporting post removably attached substantially in an upright position to the handlebar stem of the bicycle and including an lower post member of cylindrical shape and an upper post member telescopically received in the lower post member; lock means for locking the upper post member in position in the lower post member; clamping means attached to the upper end of the upper post member of said supporting post for detachably clamping the handle of the umbrella, said clamping means including a pair of clamping members having their inner sides facing each other for clamping inbetween the handle of the umbrella, said clamping means further including operating means for bringing, when manually operated, one of the clamping members toward the other; and a bracket fixed to the lower end of the lower post member of said supporting post and formed with a lock hole sized and positioned to admit the head lock nut of the bicycle thereby to lock said umbrella supporting device as a whole at the handlebar stem of the bicycle.

BRIEF DESCRIPTION OF THE DRAWINGS

Other objects and advantages of the present invention will become apparent from the following description taken in conjunction with the accompanying drawings, in which:

FIG. 1 is a side elevation showing the overall construction of an umbrella supporting device according to the present invention;

FIG. 2 is an enlarged and exploded perspective view showing a portion of the umbrella supporting device shown in FIG. 1;

FIG. 3 is an enlarged perspective view showing another portion of the umbrella supporting device of FIG. 1;

FIG. 4 is an explanatory perspective view showing the conditions, under which the umbrella supporting device shown in Figs. 1 to 3 is attached to a bicycle while supporting an umbrella;

FIG. 5 is similar to FIG. 1 but shows another embodiment of the present invention;

FIG. 6 is similar to FIG. 2 but shows a portion of the umbrella supporting device shown in FIG. 5;

DESCRIPTION OF THE PREFERRED EMBODIMENT

Figure 7:
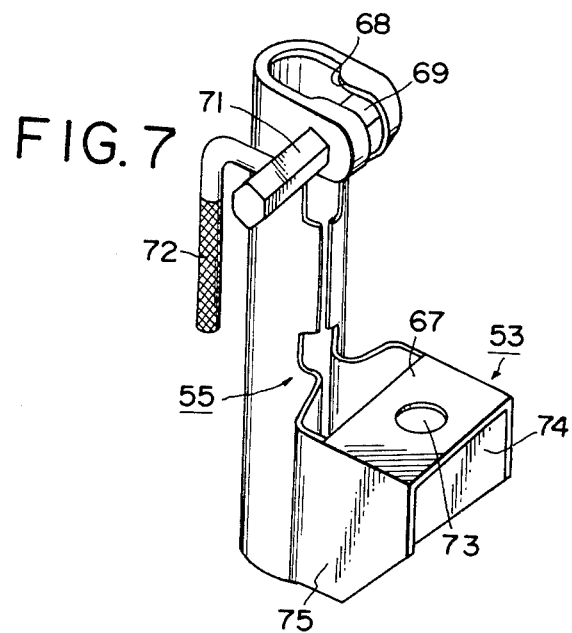
FIG. 7 is similar to FIG. 3 but shows another portion of the umbrella supporting device of FIG. 5.

Generally indicated by reference numeral 10 in FIG. 1 is an umbrella supporting device according to the present invention which generally includes a supporting post 11, a clamping mechanism 12 and a bracket 13. The supporting post 11 is divided into upper and lower post members 14 and 15, both of which are made of cylindrical pipes. The upper post member 14 is formed at its upper end with a flattened portion, to which the clamping mechanism 12 is attached. The upper post member 14 thus formed has a smaller diameter than the lower post member 15 so that the former can be telescopically received in the latter. As a result, the total length of the supporting post 11 can be adjusted to a desired value. The lower post member 15 is formed on its upper end with an external thread and in its upper end with a slit 16 which extends longitudinally from the upper extremity. A lock nut 17 having a corresponding internal thread is fastened on the external thread of the lower post member 15 so that the upper post member 14 can be locked in position in the lower post member 15.

Turning now to FIG. 2, the clamping mechanism 12 is constructed to include a receiving plate 18, which is formed at its leading end with a V-shaped vertical groove for receiving therein the handle of an umbrella, and an clamping arm 19 which is connected pivotally to the receiving plate 18 by means of a link mechanism and which has its inner side facing that of the receiving plate 18 so as to clamp inbetween the umbrella handle. More specifically, the clamping arm 19 has its trailing end supported pivotally by means of a pin (unreferenced) on a base 21 which is fixedly mounted on the body of the receiving plate 18. The clamping arm 19 is further connected to the base 21 by means of an operating lever arm 22, which has its bifurcated leg portions connected to the base 21 by means of a not-numbered pin, and a pair of link plates 23 which are also connected at their leading ends to the base 21 by means of a pin (unreferenced). As a result, the clamping arm 19 can be brought toward the receiving plate 18 by manually operating the lever arm 22. A clamping member 24 having a cork stopper shape is mounted on the leading end of the clamping arm 19 so that it may be carried into the V-shaped groove of the receiving plate 18 so as to clamp and support the umbrella handle fixedly in the V-shaped groove when it is brought thereinto together with the clamping arm 19 by the manual operation of the lever arm 22. The clamping mechanism 12 thus constructed is attached to the supporting post 11 by fitting an anchor bolt 25, which is anchored in the back of the body of the receiving plate 18, in a vertical slot 26, which is formed in the flattened upper end portion of the upper post member 14 of the supporting post 11, and then by fastening a nut 27 on the head of the anchor bolt 25. If desired, the clamping mechanism can be tilted as a whole relative to the supporting post 11. For this purpose, an auxiliary plate 28 is attached to the back of the receiving plate 18 and is formed with a series of round notches 29. Moreover, a tilting pin 31 is anchored at the flattened upper end portion of the upper post member 14 of the supporting post 11 such that it can engage selectively with one of the round notches 29 of the auxiliary plate 28 so as to fix the clamping mechanism 12 in a desired titled position relative to the supporting post 11 when the former 12 is attached to the latter 11. In accordance with this tilting angle, therefore, an umbrella can be supported at a desired angle by means of the clamping mechanism 12.

Turning further to FIG. 3, the bracket 13 is fixed to the lower end of the lower post member 15 of the supporting post 11. The bracket 13 thus fixed is formed at its horizontal plate portion with a lock hole 32 which is sized and positioned to admit the head lock nut of a bicycle so as to lock the umbrella supporting device 10 as a whole at the handlebar stem of the bicycle.

With further reference to FIG. 4, the umbrella supporting device 10 according to the present invention is attached to the handlebar stem 33, which is located at the center of the handlebar 34 of a bicycle, in a manner that the bracket 13 thereof is fixed to the handlebar stem 33 by fastening the head lock nut 35 into the handlebar stem 33. Prior to such attaching operation, the head lock nut 35 can be loosened for removal without any difficulty by means of a spanner or the like. After the body of the umbrella supporting device 10 is attached to the bicycle in the manner as described above, the tilted angle of the receiving plate 18 bolted to the supporting post 11 is adjusted to a desired value. Then, the handle 36 of the umbrella is applied to the V-shaped groove of the receiving plate 18 while holding the umbrella substantially in an upright position. At the same time, the clamping arm 19 is turned by manually operating the lever arm 22 so as to carry the clamping member 26 to the umbrella handle 36, as better seen from FIG. 2. Thus, the umbrella can be firmly supported on the bicycle at the center thereof.

Turning now to FIG. 5, another umbrella supporting device exemplifying the present invention is generally indicated by reference numeral 50. In this embodiment, there is also attached to the upper end of a supporting post 51 a clamping mechanism 52, to the lower end of which a bracket 53 is fixed. The supporting post 51 is also divided into upper and lower post members 54 and 55, the former of which is made of a cylindrical pipe while the latter of which is made of a split sleeve. The upper post member is also formed at its upper end with a flattened portion for supporting thereon the clamping mechanism 52.

Figure 8:
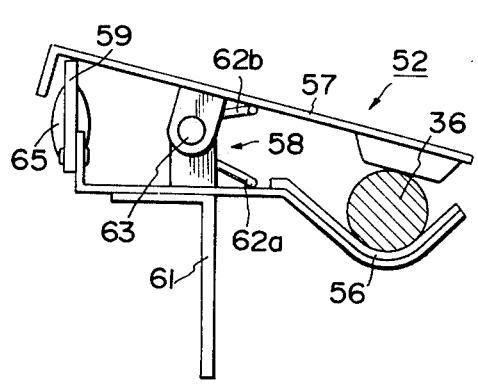
FIG. 8 is an explanatory top plan view showing the conditions, under which the umbrella supporting device shown in Figs. 5 to 7 is supporting an umbrella.

Turning now to FIGS. 6 and 8, the clamping mechanism 52 is constructed to include a pair of clamping plates 56 and 57 which are made to have their inner sides facing each other and which are connected pivotally to each other by means of a hinge 58. The two clamping plates 56 and 57 thus pivotally connected can be fixed by means of an eccentric cam 59 such that their one side ends are forced to approach each other. The clamping plate 56 is formed at its one leading end with a bent portion of V-shape and is bolted to the upper end of the upper post member 54 by means of a bracket member 61 of L-shape, which is fixed to the back of the clamping plate 56. The other clamping plate 57, which is hinged to the clamping plate 56, is made to have its leading clamping side bulged to correspond to the V-shaped recess of the opposite plate 56. The complementary clamping ends of the clamping plates 56 and 57 are biased apart from each other by means of a torsion spring 62 which is mounted on a pivot pin 63 constituting the hinge 58. For this purpose, the torsion spring 62 has its ends 62a and 62b retained on the facing sides of the two clamping plates 56 and 57. On the other hand, the eccentric cam 59 is attached pivotally to the other side of the clamping plate 56 and is made to have its one side bulged to have a radius r about a pivot pin 64. The eccentric cam 59 thus made can be operated to force its bulged arcuate periphery into abutment contact with the inner side of the opposite clamping plate 57. For this purpose, an operating handle 65 is made to extend radially outwardly from the arcuate periphery of the cam 59. Moreover, a stopper 66 is formed to extend downwardly from the clamping plate 57 at a position corresponding to the rotations of the operating handle 65 so that it can regulate the terminal end of rotations of the handle 65.

Turning further to FIG. 7, the bracket 53 of the second embodiment of the present invention is made integral with the lower post member 55 of sleeve. The bracket 53 thus made is formed with a horizontal plate 67 which extends perpendicularly of the axis of the lower post member 55. This post member 55 is formed with a slit 68 which extends longitudinally through the wall thereof. An internal thread is formed in the upper end of the lower post member 55 in the vicinity of the through slit 68. There is inserted into the internal slit a lock bolt 69 which is formed with an external thread sized to engage with that internal thread. As a result, the lock bolt 69 can reduce the width of the slit 68 when it is fastened. In order to ensure and facilitate the fastening operation, there are provided both a fastening nut 71, which is made to extend coaxially from the lock bolt 69, and an operating bar 72 which is attached sideway to the fastening nut 71. Thus, the lock bolt 69 can be fastened and loosened without any difficulty through the fastening nut 71 by manually turning the operating bar 72. On the other hand, the bracket 53 thus constituted is also formed at its horizontal plate 67 with a lock hole 73 which is sized and positioned to admit the head lock nut of a bicycle so as to lock the umbrella supporting device 50 as a whole at the handlebar stem of the bicycle. The bracket 53 is further formed at the both side edges with a pair of vertical plates 74 and 75, which extend downwardly therefrom so that the bracket 53 can embrace the handlebar stem of the bicycle so as to be prevented as a whole from swinging on the handlebar stem. In an alternative, an elongated notch may be formed in the horizontal 67 in place of the lock hole 73, if desired.

Figure 9:
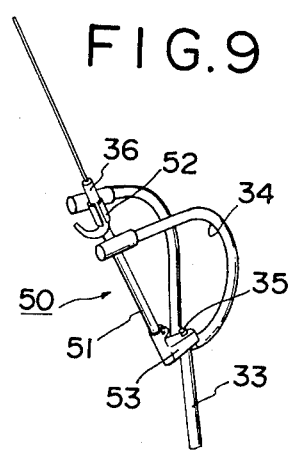
FIG. 9 is similar to FIG. 4 but shows the conditions, under which the umbrella supporting device shown in Figs. 5 to 8 is attached to a bicycle while supporting an umbrella.

With further reference to FIG. 9, the attachment and detachment of the umbrella supporting device 50 according to the second embodiment of the present invention is carried out substantially in a similar manner to the device 10 according to the first embodiment, and as such their repeated description is omitted here except for the following explanation. Reverting to FIGS. 5 to 8 in addition to FIG. 9, the head lock nut 35 of a bicycle, from which its nut has been removed in advance, is inserted into the lock hole 73 of the horizontal plate 67 of the branch 53 so that this branch 53 may be placed on the handlebar stem 33 of the bicycle. Then, the head lock nut 35 is fastened to fix the bracket 53 on the handlebar stem 33 so that the umbrella supporting device 50 as a whole can be supported substantially in an upright position on the bicycle.

An umbrella can then be supported on its supporting device 50 such that its handle 36 is clamped between the clamping plates 56 and 57 of the clamping mechanism 52 which is attached to the upper end of the supporting post 51. Since, more specifically, the clamping plates 56 and 57 are normally biased apart from each other by the action of the torsion spring 62, the umbrella handle 36 is inserted into the space inbetween such that it is applied to the V-shaped bent portion of the clamping plate 56. Under this condition, the operating handle 65 is operated to bring the bulged arcuate edge of the eccentric cam 59 into abutment contact with the inner side of the opposite clamping plate 57. When the eccentric cam 59 abuts, the clamping plate 57 is turned toward its partner plate 56 against the action of the torsion spring 62 so that the umbrella handle 36 is clamped firmly inbetween. As a result, the umbrella can be supported at the center of the bicycle, namely, on an extension of the handlebar stem thereof. In this instance, moreover, the level of the umbrella can be adjusted, if desired, by simply loosening the fastening nut 71, which fixes the bracket 53 to the supporting post 51, to allow sliding of the post 51 up and down.

As has been described hereinbefore, according to the present invention, an umbrella can be removably attached to the handlebar stem of a bicycle so that a rider is free from carrying the umbrella with his one hand, even if he rides the bicycle in rainy or hot weather, thus ensuring his safety. Since, moreover, the supporting point of the umbrella is located at the center of the handlebar, so the rider will have no difficulties in handling the bicycle.

What is claimed is:

1. An umbrella supporting device for detachably supporting an umbrella in an upright perpendicular or vertically angular position on the handlebar of a bicycle, comprising:

a supporting post adapted to be removably attached in an upright position to the handlebar stem of the bicycle and including a lower post member of cylindrical shape and an upper post member telescopically received in the lower post member;

lock means for locking the upper post member in fixed vertical position in the lower post member;

clamping means attached to the upper end of the upper post member of said supporting post for detachably clampingly receiving the handle of the umbrella, said clamping means including a pair of clamping members having their inner sides facing each other for clamping therebetween the handle of the umbrella, said clamping means including manual operating means for moving the clamping members together;

a bracket means fixed to the lower end of the lower post member of said supporting post and formed with a lock hole sized and positioned to admit the head lock nut of the bicycle thereby to lock said umbrella supporting device as a whole at the handlebar stem of the bicycle and tilting means for fixedly locating the bracket means in secured tilted positions angularly relative to the handlebar of the bicycle whereby the umbrella can be fixedly located in selected vertical angular relation to the bicycle.

2. An umbrella supporting device according to claim 1, wherein said clamping means further includes link means interposed between the paired clamping members and coactively arranged with said operating means for effecting the moving operation of the latter.

3. An umbrella supporting device according to claim 1, wherein said lock means includes an external thread formed on the upper end of the lower post member of said supporting post, a slit formed longitudinally in the upper end of said lower post member, and a lock nut formed with an internal thread so that it may be screwed on the external thread of said lower post member thereby to effect the locking operation of said lock means.

4. An umbrella supporting device according to claim 1, wherein said tilting means includes an auxiliary member attached to one of the clamping members of said clamping means and formed with a series of round notches, and a tilting pin anchored at the upper end of the upper post member of said supporting post and sized and positioned to engage with one of the round notches of said auxiliary member thereby to fix said clamping means in position relative to said supporting post.

5. An umbrella supporting device according to claim 1, wherein said clamping means further includes bias means for biasing the clamping members of said clamping means apart from each other, and wherein said operating means includes an eccentric cam attached pivotally to one of the clamping members of said clamping means and made coactive with the other of the same for ensuring its bringing operation against the biasing action of said bias means.

6. An umbrella supporting device according to claim 5, wherein said bias means includes a torsion spring interposed between the paired clamping members of said clamping means.

7. An umbrella supporting device according to claim 1, wherein said lock means includes a slit formed longitudinally in the lower post member of said supporting post, an internal thread formed in the upper end of said lower post member in the vicinity of said slit, a lock bolt formed with an external thread sized to engage with the internal thread of said lower post member, a fastening nut extending coaxially from said lock bolt, and an operating bar attached sideway to said fastening nut for screwing said lock bolt into the internal thread of said lower post member thereby to effect the locking operation of said lock means.

* * * * *